United States Patent
Plank (10) Patent No.: US 11,843,878 B2
(45) Date of Patent: Dec. 12, 2023

(54) SENSOR DEVICES, ELECTRONIC DEVICES, METHOD FOR PERFORMING OBJECT DETECTION BY A SENSOR DEVICE, AND METHOD FOR PERFORMING OBJECT DETECTION BY AN ELECTRONIC DEVICE

(71) Applicant: Infineon Technologies AG, Neubiberg (DE)

(72) Inventor: Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/836,603

(22) Filed: Jun. 9, 2022

(65) Prior Publication Data

US 2022/0400220 A1    Dec. 15, 2022

(30) Foreign Application Priority Data

Jun. 11, 2021 (EP) ..................... 21178955

(51) Int. Cl.
*H04N 25/50* (2023.01)
*H04N 25/75* (2023.01)
(Continued)

(52) U.S. Cl.
CPC ........... *H04N 25/50* (2023.01); *G01S 17/894* (2020.01); *H04N 25/75* (2023.01); *H04N 25/79* (2023.01)

(58) Field of Classification Search
CPC ........ H04N 25/50; H04N 25/75; H04N 25/79; G01S 17/894
See application file for complete search history.

(56) References Cited

U.S. PATENT DOCUMENTS

2005/0024524 A1* 2/2005 Yourlo ................... H04N 25/59
                                                          348/E5.081
2012/0076361 A1* 3/2012 Fujiyoshi ............... G06V 10/50
                                                          382/103
(Continued)

FOREIGN PATENT DOCUMENTS

CN         102831447 A      12/2012

OTHER PUBLICATIONS

Neeru, Nirvair, et al., "Face Recognition based on LBP and CS-LBP Technique under Different Emotions", 2015 IEEE international Conference on Computational intelligence and Computing Research, 2015, pp. 1-4.

*Primary Examiner* — Lin Ye
*Assistant Examiner* — Chriss S Yoder, III
(74) *Attorney, Agent, or Firm* — Murphy, Bilak & Homiller, PLLC (57) ABSTRACT

A sensor device is provided. The sensor device includes an image sensor having a plurality of photo-sensitive pixels configured to measure light received from a scene. The image sensor is configured to output image data indicative of measurement values of at least part of the plurality of photo-sensitive pixels. Additionally, the sensor device includes processing circuitry configured to determine a histogram based on the image data. The histogram represents a distribution of the measurement values. The processing circuitry is further configured to determine whether an object is present in the scene based on the histogram. In addition, the sensor device includes interface circuitry configured to output presence data indicating whether the object is present in the scene.

14 Claims, 6 Drawing Sheets

(51) Int. Cl.
 *H04N 25/79* (2023.01)
 *G01S 17/894* (2020.01)

(56) References Cited

U.S. PATENT DOCUMENTS

| | | | |
|---|---|---|---|
| 2016/0094800 A1* | 3/2016 | Gousev | H04N 23/651 |
| | | | 348/310 |
| 2017/0374322 A1 | 12/2017 | Gousev et al. | |
| 2023/0011969 A1* | 1/2023 | Vaello Paños | G01S 17/894 |

\* cited by examiner

SENSOR DEVICES, ELECTRONIC DEVICES, METHOD FOR PERFORMING OBJECT DETECTION BY A SENSOR DEVICE, AND METHOD FOR PERFORMING OBJECT DETECTION BY AN ELECTRONIC DEVICE

TECHNICAL FIELD

The present disclosure relates to object detection. In particular, examples relate to sensor devices, electronic devices, a method for performing object detection by a sensor device and a method for performing object detection by an electronic device.

BACKGROUND

Power consumption is an important characteristic for imaging devices. For example, it is very important for a mobile phone with face-unlock functionality that the mobile phone unlocks immediately when a user faces the mobile phone. The mobile phone, however, needs to detect that the user faces the mobile phone. A significant amount of energy is needed to determine with conventional imaging devices (e.g. a conventional Time-of-Flight, ToF, sensor) whether the user faces the mobile phone.

Hence, there may be a demand for improved object detection.

SUMMARY

The demand may be satisfied by the subject matter of the appended claims.

An example relates to a sensor device. The sensor device comprises an image sensor comprising a plurality of photo-sensitive pixels configured to measure light received from a scene. The image sensor is configured to output image data indicative of measurement values of at least part of the plurality of photo-sensitive pixels. Additionally, the sensor device comprises processing circuitry configured to determine a histogram based on the image data. The histogram represents a distribution of the measurement values. The processing circuitry is further configured to determine whether an object is present in the scene based on the histogram. In addition, the sensor device comprises interface circuitry configured to output presence data indicating whether the object is present in the scene.

Another example relates to an electronic device comprising a sensor device as described herein and an application processor coupled to the sensor device. The application processor is configured to receive the presence data and perform an action based on the presence data.

A further example relates to a method for performing object detection by a sensor device. The method comprises measuring light received from a scene by a plurality of photo-sensitive pixels of an image sensor of the sensor device. Further, the method comprises determining, by processing circuitry of the sensor device, a histogram based on image data output by the image sensor. The image data are indicative of measurement values of at least part of the plurality of photo-sensitive pixels. The histogram represents a distribution of the measurement values indicated by the image data. In addition, the method comprises determining, by the processing circuitry, whether an object is present in the scene based on the histogram. The method further comprises outputting, by interface circuitry of the sensor device, presence data indicating whether the object is present in the scene.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
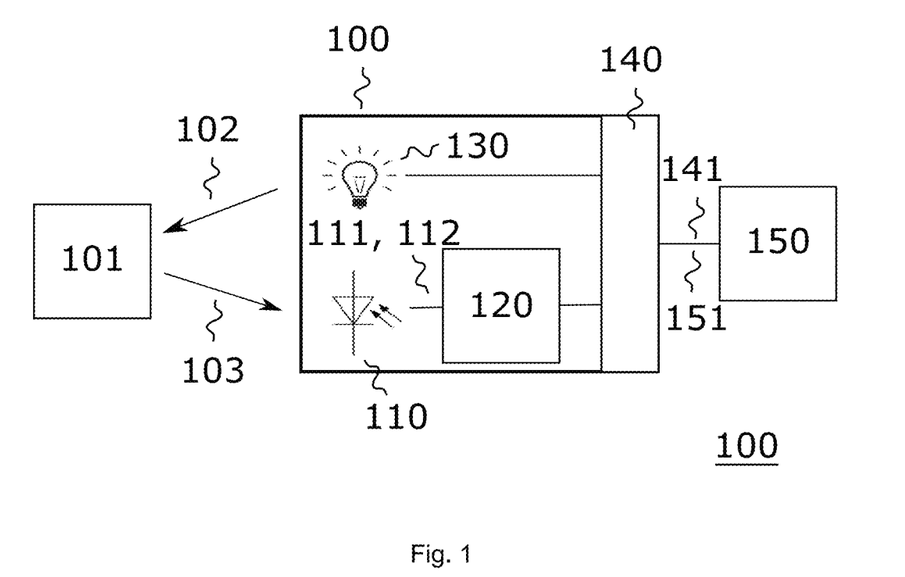
FIG. 1 illustrates an example of a sensor device.

FIG. 1 illustrates an example of a sensor device 100. The sensor device 100 comprises an illumination element (circuitry, device) 130 for emitting (e.g. modulated) light 102 to a scene and an image sensor 110 for capturing light 103 received from the scene.

The illumination element 130 generates the (e.g. modulated) light 102. The illumination element 130 may comprise any number of light sources. The illumination element 130 may, e.g., comprise one or more Light-Emitting Diodes (LEDs) and/or one or more laser diodes (e.g. one or more Vertical-Cavity Surface-Emitting Lasers, VCSELs) which are fired based on an illumination signal.

The image sensor may be a two-dimensional (2D) or a three-dimensional (3D) image sensor. The image sensor 110 comprises a plurality of photo-sensitive pixels (e.g. comprising a Photonic Mixer Device, PMD, or a Charge-Coupled Device, CCD) configured to measure the light 103 received from a scene. The image sensor 110 may comprise various additional components such as e.g. optics (e.g. one or more lenses) and electronic circuitry. The image sensor 110 is configured to output image data 111 indicative of measurement values of at least part of the plurality of photo-sensitive pixels.

For various reasons, it may be desirable to know whether a predetermined object 101, a predetermined class of objects or a predetermined group (combination) of objects is present in the scene. For example, the object 101 may be a face of a human being, a predetermined room, a wet road, a dirty road, rain or fog. However, the present disclosure is not limited thereto. In general, the object 101 may be any physical object (i.e. anything material that may be perceived by the human senses). In case the object 101 is present in the scene, the object 101 reflects the emitted light 102 and, hence, generates at least part of the light 103 received from the scene.

For enabling detection of the object 101, the sensor device 100 comprises processing circuitry 120, which is coupled to the image sensor 110. For example, the processing circuitry 120 may be a single dedicated processor, a single shared processor, or a plurality of individual processors, some of which or all of which may be shared, a neuromorphic processor, a digital signal processor (DSP) hardware, an application specific integrated circuit (ASIC) or a field programmable gate array (FPGA). The processing circuitry 120 may optionally be coupled to, e.g., read only memory (ROM) for storing software, random access memory (RAM) and/or non-volatile memory. The processing circuitry 120 is configured to receive the image data 111 and determine a histogram based on the image data 111.

The histogram represents a distribution of the measurement values. The range of possible measurement values is divided into a plurality (series) of intervals, which are also known as "bins", for the histogram such that the histogram indicates how many of the measurement values fall into each interval (bin). In other words, the number of photo-sensitive pixels outputting the same measurement value is counted in each bin of the histogram. The bins are specified as consecutive, non-overlapping intervals of the range of possible measurement values. The bins are adjacent and of equal size. In alternative examples, the bins may be of different size. The granularity of the bins may be selected as desired. For example, a separate bin may be provided for each possible measurement value in the range of possible measurement values. In other examples, a respective single bin may be provided for two or more consecutive possible measurement values in the range of possible measurement values. In other words, a bin of the histogram may represent a single possible measurement value in the range of possible measurement values or a plurality of consecutive possible measurement values in the range of possible measurement values. Any number of bins may be used (e.g. 40 or 64 bins).

For example, the histogram may be a one-dimensional (1D) vector with a plurality of vector elements (entries). Each vector element (entry) represents a bin, i.e., a respective possible measurement value or a respective plurality of consecutive possible measurement values. The value of the respective vector element (entry) denotes the number of photo-sensitive pixels outputting a measurement value identical to the possible measurement value represented by the respective vector element (entry) or included in the plurality of consecutive possible measurement values represented by the respective vector element (entry).

The processing circuitry 120 is further configured to determine whether an object such as the object 101 is present in the scene based on the histogram. In particular, the processing circuitry 120 is configured to determine whether a predetermined object, a predetermined class of objects or a predetermined group (combination) of objects is present in the scene based on the histogram. The object detection based on the histogram is possible as the histogram exhibits a specific pattern in case a given (predetermined) object, a given (predetermined) class of objects or a given (predetermined) group (combination) of objects is present in the scene. This is exemplarily illustrated in FIGS. 2 and 3.

Figure 2:
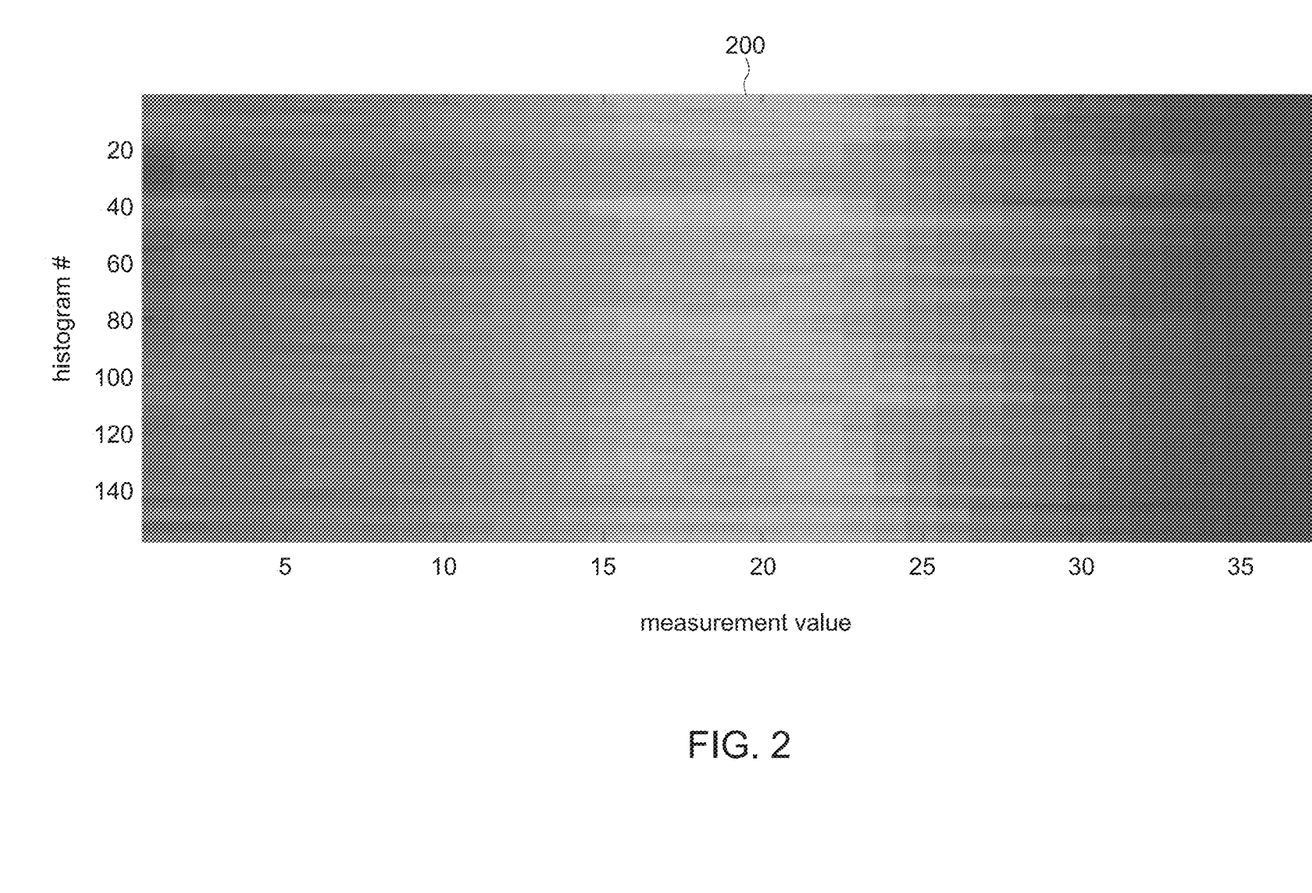
FIG. 2 illustrates an exemplary heat map of a first plurality of histograms.

FIG. 2 illustrates a heap map 200 for 160 histograms. Each line of the heat map 200 represents one of the 160 histograms. The abscissa of the heap map 200 denotes the 40 bins of the respective histogram.

In the example of FIG. 2, a face of a human being was captured under different angles and for different distances by the sensor device 100 so as to generate respective image data. The histograms are generated by the processing circuitry 120 from the image data. The example of FIG. 2 is representative for an environment seen by a mobile device such as a mobile phone when a user is operating the mobile device. For example, the example of FIG. 2 may represent the environment seen by a mobile device when user wishes to face-unlock the mobile device.

As can be seen from FIG. 2, all histograms exhibit a similar pattern, i.e., a similar distribution of the measurement values measured by the image sensor 110. The respective distribution of the measurement values peaks between bins 15 to 25 for each histogram. A significantly reduced number of measurement values falls into the bins 0 to 15 and 25 to 40.

Figure 3:
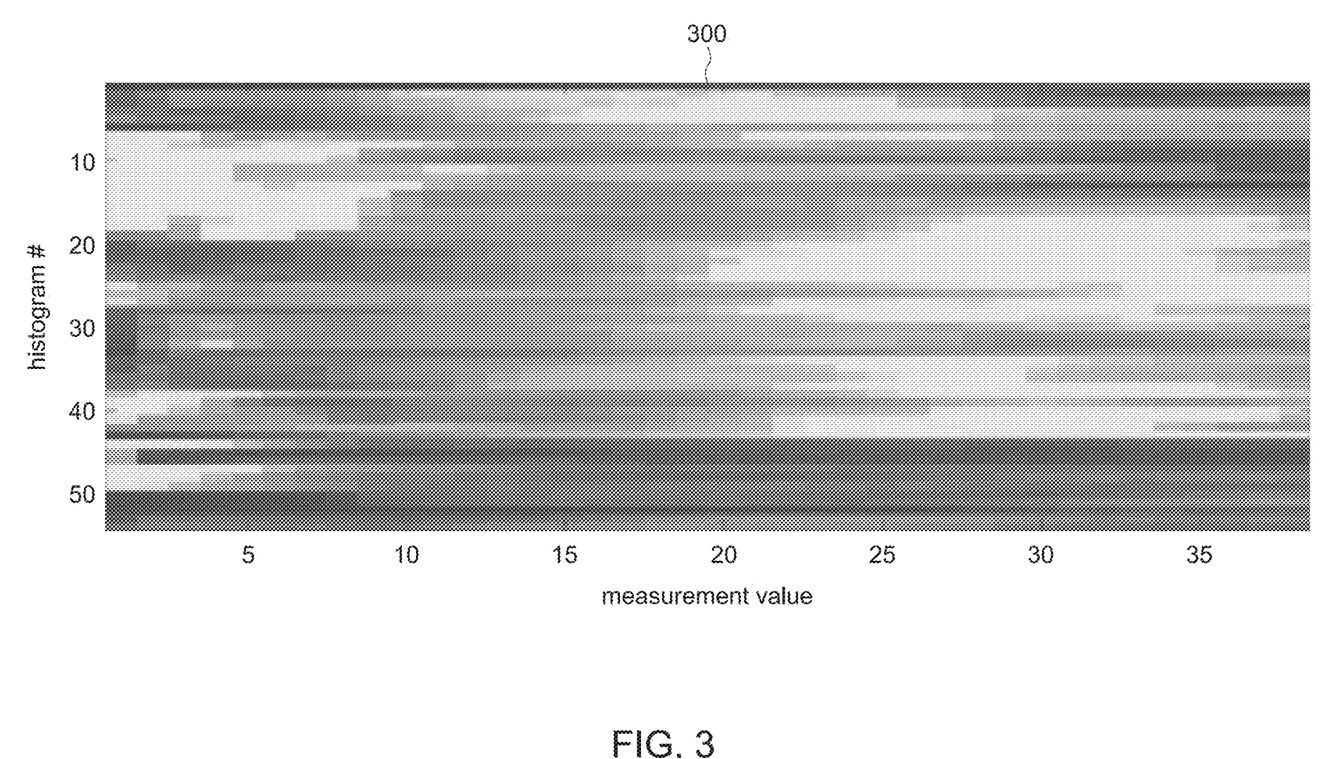
FIG. 3 illustrates an exemplary heat map of a second plurality of histograms.

As a comparison, FIG. 3 illustrates another heat map 300 for 60 histograms. Each line of the heat map 300 represents one of the 60 histograms. The abscissa of the heap map 300 denotes the 40 bins of the respective histogram.

In the example of FIG. 3, no face was present in the scene contrary to the example of FIG. 2. As can be seen from FIG. 3, the histograms no longer exhibit a similar pattern. The individual histograms peak at different bin ranges.

A histogram according to the present disclosure does not contain any information about the positions of the image sensor 110's photo-sensitive pixels and, hence, does not comprise any geometrical information contained in the image data 111. Nevertheless, as can be seen from the examples of FIGS. 2 and 3, a histogram contains enough information to detect (classify) an object such as a face of a human being. Accordingly, the processing circuitry 120 is able to determine whether an object such as the object 101 is present in the scene based on the histogram generated from the image data 111 of the image sensor 110.

The processing circuitry 120 outputs presence data 141 indicating whether the object 101 is present in the scene. For example, the presence data 141 may indicate whether a predetermined object or a predetermined class of objects is present in the scene.

In addition, the sensor device 100 comprises interface circuitry 140 configured to the output the presence data 141. The presence data 141 may be further processes by external circuitry 150 such as an application processor of an electronic device comprising the sensor device 100.

The processing circuitry 120 may determine in various ways whether the object 101 is present in the scene. For example, the processing circuit 120 may be configured to process the histogram by a classification algorithm to determine whether the object 101 is present in the scene. In the following two exemplary classification algorithms will be described in detail. However, it is to be noted that the present disclosure is not limited thereto and that any other suitable classification algorithm may be used as well.

In the first exemplary classification algorithm, a reference histogram is used. The reference histogram is generated based on one or more histogram of the object whose presence in the scene is to be detected. For example, the object may be captured one or more times by the sensor device 100 such that the image sensor 110 generates reference image data. The histograms are generated by the processing circuitry 120 based on the reference image data output by the image sensor 110. For example, the reference histogram may be formed by the median for each bin of the histograms generated based on the reference image data. However, it is to be noted that the present disclosure is not limited thereto and that also any other suitable combination of the histograms generated based on the reference image data may be used as well (e.g. weighted averaging of the individual bins).

The first exemplary classification algorithm determines as an error measure E the sum of the absolute differences between the bins of the histogram generated from the image data 111 and the bins of the reference histogram:

$$E = \Sigma_i \text{abs}(h_{ref}(i) - h(i)) \quad (1),$$

with i denoting the number of the respective bin in the histogram generated from the image data 111 and the reference histogram, $h_{ref}(i)$ denoting the value of the i-th bin in the reference histogram, $h(i)$ denoting the value of the i-th bin in the histogram generated from the image data 111, and abs( ) denoting the absolute value function.

Further, the first exemplary classification algorithm determines that the object is present in the scene if the error measure E, i.e., the sum of the absolute differences, is below a threshold value T. In case the error measure E, i.e., the sum of the absolute differences, is above a threshold value T, the first exemplary classification algorithm determines that the object is not present in the scene. This may be expressed as a decision function d:

$$d(E) := \begin{cases} 1 & \text{if } E < T \\ 0 & \text{if } E > T \end{cases} \quad (2)$$

with 1 denoting that the object is present in the scene and 0 denoting that the object is not present in the scene.

Figure 4:
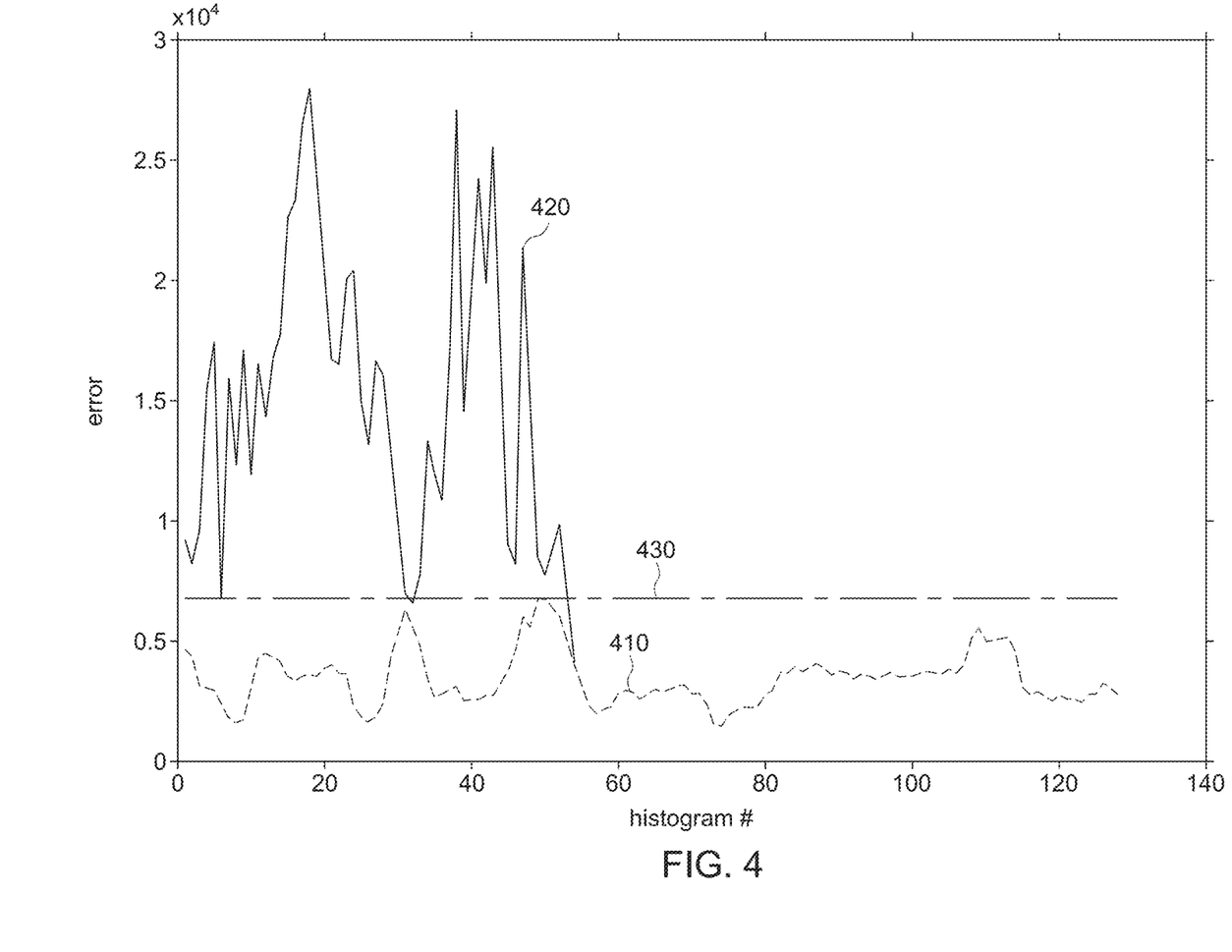
FIG. 4 illustrates exemplary errors for two pluralities of histograms.

FIG. 4 illustrates an exemplary error plot. In the example of FIG. 4, the curve 410 represents the respective error measure E, i.e., the sum of the absolute differences for 130 histograms of a first data set. Similarly, the curve 420 represents the respective error measure E, i.e., the sum of the absolute differences for 55 histograms of a second data set. The abscissa denotes the number of the respective histogram. The ordinate denotes the error measure E for the respective histogram. The line 430 represents the threshold value T.

A face of a human being was captured under different angles and for different distances by the sensor device 100 for the histograms in the first data set. No face was present in the scene for histograms in the second data.

As can be seen from FIG. 4, the respective error measure E is below the threshold value T for all histograms of the first data set. Accordingly, it is determined for all histograms of the first data set that the face is present in the scene. None of the histograms of the first data set is classified falsely.

Also, almost all histograms of the second data set are classified correctly. The respective error measure E is above the threshold value T for all but four histograms of the second data set. Accordingly, it is determined for all but four histograms of the second data set that the face is not present in the scene. The false classification of only four histograms of the second data set is acceptable.

The threshold value T may be set manually. Alternatively, the threshold value T may be determined from the reference image data output by the image sensor 110. For example, the threshold value T may be learned when generating the reference histogram. The training of the first exemplary classification algorithm may be performed by the processing circuitry 120. In other words, processing circuitry 120 may be configured to train the classification algorithm based on the reference image data output by the image sensor 110.

Also in the second exemplary classification algorithm, a reference histogram is used. The reference histogram may be generated as described above. The second exemplary classification algorithm determines an intersection S of the reference histogram and the histogram generated from the image data 111:

$$S = \Sigma_i \min(h_{ref}(i), h(i)) \quad (3),$$

with min( ) denoting the minimum function returning the smallest of its arguments (inputs).

The more similar the reference histogram and the histogram generated from the image data 111 are, the greater is the intersection S. Hence, the intersection S may, similar to what is described above for the first exemplary classification algorithm, be compared to threshold in order to determine whether the object is present in the scene. Optionally, the intersection S may be normalized to a value range between 0 and 1:

$$S_{normal} = \frac{\sum_i \min(h_{ref}(i), h(i))}{\sum_i h_{ref}(i)}, \quad (4)$$

with $S_{normal}$ denoting the normalized intersection. The normalized intersection $S_{normal}$ may again be compared to a threshold value. If the normalized intersection $S_{normal}$ is below the threshold value, the second exemplary classification algorithm determines that the object is not present in the scene. In case the normalized intersection $S_{normal}$ is above the threshold value, the second exemplary classification algorithm determines that the object is present in the scene.

Both exemplary classification algorithms determine whether a predetermined object such as the object 101, a predetermined class of objects or a predetermined group (combination) of objects is present in the scene based on a comparison of the histogram generated from the image data 111 to a reference histogram.

The classification of the histogram generated from the image data 111 requires only little computing power and, may, hence be done on-chip. In other words, the sensor device 100 may comprises a semiconductor die comprising both the image sensor 110 and the processing circuitry 120.

As described above, the image sensor 110 may, in general, be any kind of 2D or 3D image sensor. The respective measurement value of photo-sensitive pixel of the image sensor 110 indicates a respective amount of light received by the photo-sensitive pixel (for example, the image data 111 may represent an 2D grayscale image of at least part of the scene). As described above, the image data 111 indicate the measurement values of at least part of the plurality of photo-sensitive pixels of the image sensor 110. It is to be noted that the image data indicate the measurement values of the at least part of the plurality of photo-sensitive pixels for a single exposure of the plurality of photo-sensitive pixels.

In some examples, at least one of the plurality of photo-sensitive pixels of the image sensor 110 may be configured to selectively store charge carriers generated by the light received from the scene in semiconductor material of the at least one of the plurality of photo-sensitive pixels in different charge storages or a drain node of the at least one of the plurality of photo-sensitive pixels over time. Accordingly, the respective measurement value of the at least one of the plurality of photo-sensitive pixels is based on the charge carriers stored in at least one of the different charge storages or the drain node. In other examples, at least one of the plurality of photo-sensitive pixels of the image sensor 110 may be configured to generate its respective measurement value based on a correlation of the light 103 received from the scene with a reference signal used for driving the at least one of the plurality of photo-sensitive pixels. The image sensor may, e.g., be a ToF sensor operating according to one of the above principles.

In case the image sensor 110 is a ToF sensor, at least one of the plurality of photo-sensitive pixels may be configured to measure the light 103 received from the scene using a (light-intensity-independent) correlation function that increases (e.g. strictly monotonic) over distance within a target measurement range of the ToF sensor 110. In other words, parameters of the at least one of the plurality of photo-sensitive pixels may be adjusted such that the (light-intensity-independent) correlation function increases (e.g. strictly monotonic) over distance within the target measurement range of the ToF sensor 110. The (light-intensity-independent) correlation function gives the photo-sensitive pixel's distance-dependent correlation of the received light 103 with the reference signal and without considering (i.e. ignoring, not taking into account) the intensity of the received light 103. As described above, the photo-sensitive pixel is being driven based on the reference signal. In other words, the (light-intensity-independent) correlation function only describes the distance-dependency of the photo-sensitive pixel's output (i.e. the dependency of the photo-sensitive pixel's output on the distance between the ToF sensor 110 and the object 101) but not the dependency of the photo-sensitive pixel's output on the intensity of the received light 103. The respective (light-intensity-independent) correlation function of the other photo-sensitive pixels of the ToF sensor 110 may be adjusted as described above.

The intensity (light strength) of the light 103 received from the object 101 in the scene is decreasing over the distance between the ToF sensor 110 and the object 101. For example, it may be assumed that the intensity decreases according to the inverse square law. That is, the distance-dependent intensity of the light 103 received at the ToF sensor 110 may be assumed as follows:

$$I(d) \propto \frac{1}{d^2} \qquad (5)$$

with I denoting the intensity of the light 103 received at the ToF sensor 110 and d denoting distance between the ToF sensor 110 and the object 101 reflecting the emitted light 102 back to the ToF sensor 110.

Accordingly, the (light-intensity-independent) correlation function c(d) may, e.g., be adjusted to increase with the square of the distance d:

$$c(d) \propto d^2 \qquad (6)$$

The square increase of the (light-intensity-independent) correlation function is a good approximation in case the object 101 behave likes a point-like light source.

The (actual) measurement value of the at least one of the plurality of photo-sensitive pixels of the ToF sensor 110 scales with the intensity of the light 103 received at the photo-sensitive pixel (i.e. the light strength of the light 103 from the object 101). For example, the measurement value of the at least one of the plurality of photo-sensitive pixels of the ToF sensor 110 may be determined by the product of the intensity of the light 103 received at the photo-sensitive pixel and the value of the (light-intensity-independent) correlation function at the distance of the object 101 reflecting the light 103 to the photo-sensitive pixel.

As the (light-intensity-independent) correlation function increases (e.g. strictly monotonic) over distance, the decreasing light intensity over distance may be counteracted. Accordingly, a brightness of the object in the image data 111 does not depend on the distance between the object 101 and the ToF sensor 110. The measurement values of the ToF sensor 110's photo-sensitive pixels are proportional to the reflectivity of the object 101 as the reflectivity of the object 101 determines how much light arrives at the ToF sensor 110. Accordingly, the measurement values of the ToF sensor 110's photo-sensitive pixels vary with the reflectivity of the object 101—independent of the distance between the ToF sensor 110 and the object 101. Therefore, the measurement values indicated by the image data 110 represent the reflectivity of the object 101.

Many different modulation patterns for the emitted light 102 as well as the reference signal for driving the ToF sensor 110 may be used to obtain the above-described shape of the (light-intensity-independent) correlation function.

The above described image data 111 may be analog or digital data—independent of the specific implementation of the image sensor 110. For example, read-out circuitry of the image sensor 110 may be configured to read out at least part of the plurality of photo-sensitive pixels to obtain the measurement values. In some examples, all of the plurality of photo-sensitive pixels may be read out by the read-out circuitry. In other examples, only part (i.e. only a subset) of the plurality of photo-sensitive pixels may be read out by the read-out circuitry. For example, the photo-sensitive pixels may be read out by the read-out circuitry according to one or more (e.g. predefined) patterns. For example, pixel read-out may be skipped according to a pattern. Omitting the read-out of some of the photo-sensitive pixels may allow to reduce the energy consumption of the sensor device 100. The read-out measurement values may be analog values.

The analog measurement values may be digitized by means of an Analog-to-Digital Converter (ADC) of the image sensor 110. Accordingly, the processing circuitry 120 may be configured to determine the histogram based on the digitized measurement values. For example, the processing circuitry may use a set of counters for the bins of the histogram and increment the respective counter each time a certain measurement (pixel) value is digitized. Similar to what is described, a respective counter may be increased if a digitized measurement value is within a certain value range. As described above for the bins of the histogram, the value ranges may be evenly distributed among the digitized output range of the measurement values, or be optimized with individual ranges.

The ADC may support (provide) different resolutions for digitizing analog data. For example, the ADC may support at least a first resolution and a second resolution for digitizing analog data. The first resolution is lower than the second resolution. The ADC may be configured to digitize the measurement values using the first resolution. The first resolution may, e.g., match the number of histogram bins (e.g. the first resolution may be 6 bit for $2^6$=64 bins). The second resolution may be used by the ADC for digitizing further measurement values of the image sensor 110 that are obtained by the image sensor 110 for one or more further measurements of the scene (e.g. a ToF depth/distance measurement). Using the lower resolution of the ADC may be sufficient for the histogramming.

The sensor device 100 may comprise further hardware—conventional and/or custom. The elements of the sensor device 100 are (all) arranged (packaged) within a housing of the sensor device 100.

The sensor device 100 may, e.g., be used in an electronic device. An exemplary electronic device 500 (e.g. mobile phone, smartphone, tablet-computer, or laptop-computer) comprising a sensor device 510 as described above is illustrated in FIG. 5.

Figure 5:
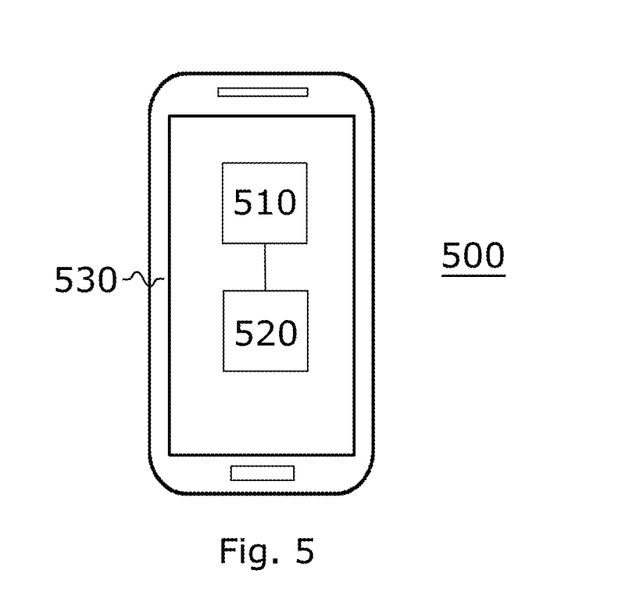
FIG. 5 illustrates an example of an electronic device.

The electronic device 500 further comprises an application processor 520 coupled to the interface circuitry of the sensor device 510. The application processor 520 is configured to receive the presence data output by the sensor device 510 and to perform an action based on the presence data. For example, the application processor 520 may be configured to launch a wake up procedure for waking up from a sleep mode and/or a lower power mode. Alternatively or additionally, the application processor 520 may launch an application or turn on/off a display 530 of the electronic device 500.

For example, if interface circuitry of the sensor device 510 outputs presence data 141 indicating that a face of a human being is present in the scene, the application processor may wake up and launch a face unlock application for unlocking the electronic device 500. The face unlock application may require reflectivity data of the object present in the scene (e.g. a grayscale image) for the face recognition. Accordingly, the application processor 520 may transmit trigger data to the interface circuitry of the sensor device 510.

In response to receiving the trigger data the image sensor of the sensor device 510 may capture the scene to generate further image data. This is further illustrated in detail in FIG. 1, in which the trigger data 151 are received from the external circuitry 150 such as the application processor 520 by the interface circuitry 140 and used to control the image sensor 110 and the illumination element 130. The further image data 112 generated by the image sensor 110 are output by the interface circuitry 140. Accordingly, the external circuitry external circuitry 150 such as the application processor 520 may process the further image data by means of, e.g., the face unlock application.

However, it is to be noted that the present disclosure is not limited to the above exemplary actions performed by the application processor 520. In general, the application processor 520 may perform any action based on the presence data output by the sensor device 510. For example, the application processor 520 may be configured to turn off the display 530 in case the presence data output by the sensor device 510 indicate that no face of a human being is present in the scene.

The sensor device 510 according to the present disclosure is an energy-efficient solution to detect with simple (e.g. on-chip) processing whether a certain type of object (e.g. a human face) is present in an image of a scene. As described above, this information may be used by the electronic device 500 (e.g. a smartphone) to trigger various actions such as a face-unlock process including face-recognition (i.e. depth) measurements. Due to the sensor device 510, the application processor 520 does not need to perform any action for the objection determination.

Although not illustrated in FIG. 5, the electronic device 500 may optionally comprise further circuitry/elements such as, e.g., one or more microphones, one or more loudspeakers, one or more antennas, one or more radio frequency transmitters and/or receivers for mobile communication, one or more data storages, one or more batteries, etc.

Figure 6:
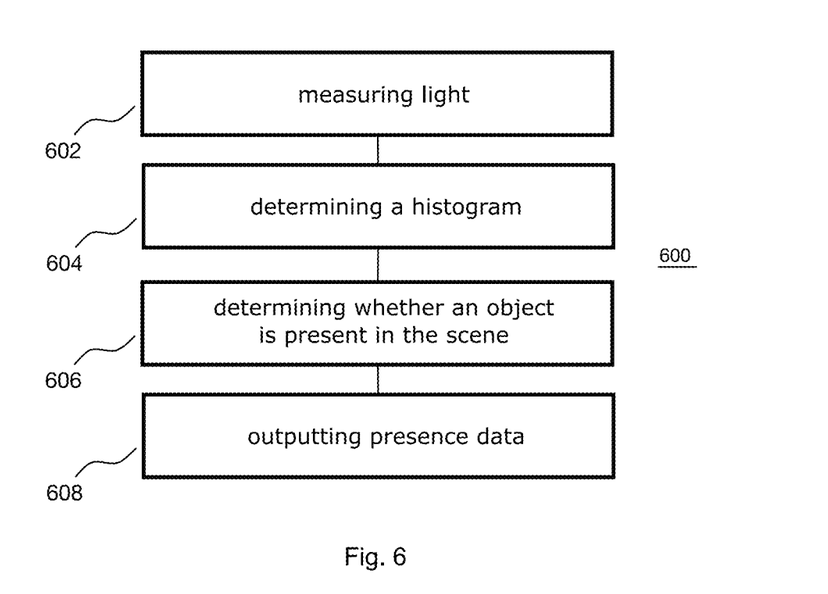
FIG. 6 illustrates a flowchart of an example of a method for performing object detection by a sensor device.

A flowchart of an example of a method 600 for performing object detection by a sensor device according to the proposed technique is further illustrated in FIG. 6. The method 600 comprises measuring 602 light received from a scene by a plurality of photo-sensitive pixels of an image sensor of the sensor device. Further, the method 600 comprises determining 604, by processing circuitry of the sensor device, a histogram based on image data output by the image sensor. The image data are indicative of measurement values of at least part of the plurality of photo-sensitive pixels. The histogram represents a distribution of the measurement values indicated by the image data. In addition, the method 600 comprises determining 606, by the processing circuitry, whether an object, a predetermined class of objects or a predetermined group (combination) of objects is present in the scene based on the histogram. The method 600 further comprises outputting 608, by interface circuitry of the sensor device, presence data indicating whether the object is present in the scene.

The method 600 may allow (e.g. on-chip) object detection with low power consumption. The direct creation of the histogram from the image sensor readout may allow to significantly reduce the image data and enable fast and simple object detection.

More details and aspects of the method 600 are explained in connection with the proposed technique or one or more examples described above. The method 600 may comprise one or more additional optional features corresponding to one or more aspects of the proposed technique or one or more examples described above.

Figure 7:
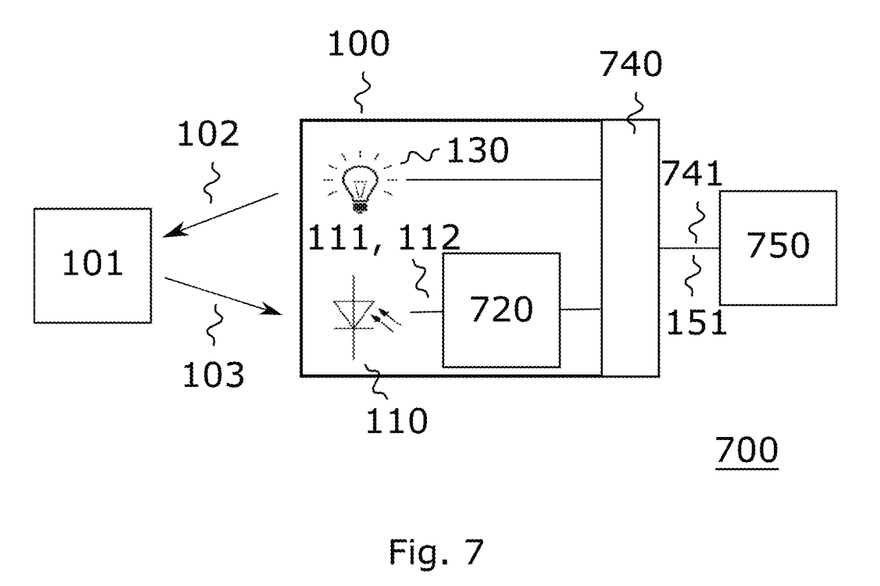
FIG. 7 illustrates another example of a sensor device.

In the above examples, the object detection is done within the sensor device. However, the present disclosure is not limited thereto. In some examples, the object detection may be performed by external circuitry. This is exemplarily illustrated in FIG. 7. FIG. 7 illustrates another sensor device 700. The sensor device 700 differs from the above described sensor device 100 in that the processing circuitry 720 is configured to only determine the histogram based on the image data. In contrast to the processing circuitry 120 of the sensor device 100, the processing circuitry 720 does not determine whether a predetermined object, a predetermined class of objects or a predetermined group (combination) of objects is present in the scene based on the histogram. The interface circuitry 740 is accordingly configured to output histogram data 741 indicative of the histogram. The histogram data 741 is output to external circuitry 750 such as, e.g., the application processor 520 of the electronic device 500 illustrated in FIG. 5. The image data 111 are not output to the external circuitry 750. Other than that, the sensor device 700 is identical to the above described sensor device 100 and may, hence, exhibit one or more of the above described features of the sensor device 100.

In the example of FIG. 7, the determination whether the predetermined object, the predetermined class of objects or the predetermined group (combination) of objects is present in the scene based on the histogram is performed by the external circuitry 750 such as, e.g., the application processor 520 of the electronic device 500 illustrated in FIG. 5. Accordingly, the sensor device 510 illustrated in FIG. 5 may be the sensor device 700 in some examples. In other words, the application processor 520 of the electronic device 500 illustrated in FIG. 5 is configured to receive the histogram data from the sensor device 510 and to determine whether the predetermined object, the predetermined class of objects or the predetermined group (combination) of objects is present in the scene based on the histogram according to some examples. The determination whether the predetermined object, the predetermined class of objects or the predetermined group (combination) of objects is present in the scene is done according to the above described principles. Other than that, the application processor 520 is configured as described above (e.g. to send the above described trigger data to the sensor device 510 if the object is present in the scene).

Figure 8:
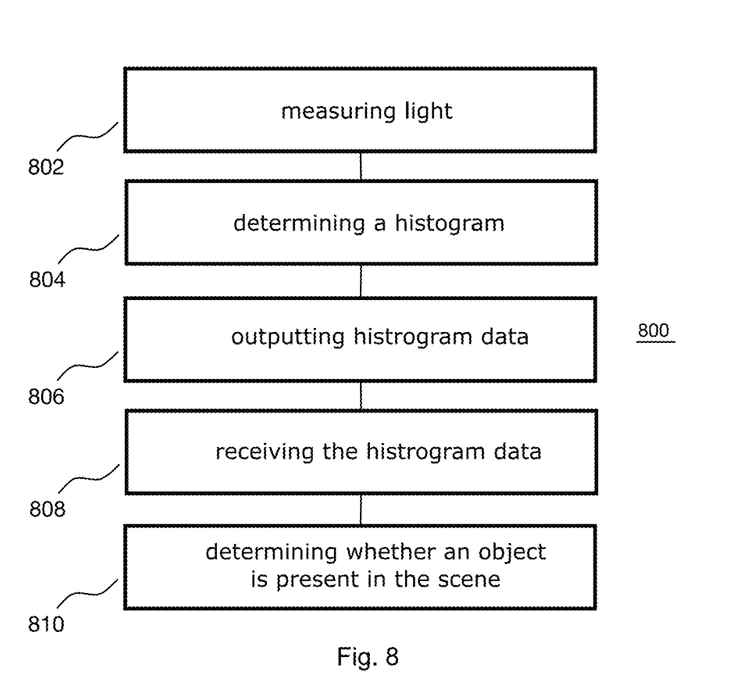
FIG. 8 illustrates a flowchart of an example of a method for performing object detection by an electronic device.

In order to summarize the proposed distributed object detection, FIG. 8 illustrates a flowchart of an example of a method 800 for performing object detection by an electronic device. The electronic device comprises a sensor device and an application processor. The method 800 comprises measuring 802 light received from a scene by a plurality of photo-sensitive pixels of an image sensor of the sensor device. Further, the method 800 comprises determining 804, by processing circuitry of the sensor device, a histogram based on image data output by the image sensor. The image data are indicative of measurement values of at least part of the plurality of photo-sensitive pixels. The histogram represents a distribution of the measurement values indicated by the image data. In addition, the method 800 comprises outputting 806, by interface circuitry of the sensor device, histogram data indicative of the histogram. The method 800 further comprises receiving 808 the histogram data at the application processor and determining 810, by the application processor, whether a predetermined object, a predetermined class of objects or a predetermined group (combination) of objects is present in the scene based on the histogram.

The method 800 may allow distributed object detection with low power consumption. The direct creation of the histogram from the image sensor readout may allow to significantly reduce the image data and enable fast and simple object detection.

More details and aspects of the method 800 are explained in connection with the proposed technique or one or more examples described above. The method 800 may comprise one or more additional optional features corresponding to one or more aspects of the proposed technique or one or more examples described above.

The examples as described herein may be summarized as follows:

Examples relate to a sensor device. The sensor device comprises an image sensor comprising a plurality of photo-sensitive pixels configured to measure light received from a scene. The image sensor is configured to output image data indicative of measurement values of at least part of the plurality of photo-sensitive pixels. Additionally, the sensor device comprises processing circuitry configured to determine a histogram based on the image data. The histogram represents a distribution of the measurement values. The processing circuitry is further configured to determine whether an object is present in the scene based on the histogram. In addition, the sensor device comprises interface circuitry configured to output presence data indicating whether the object is present in the scene.

In some examples, the sensor device further comprises a semiconductor die comprising the image sensor and the processing circuitry.

According to some examples, the image sensor comprises: read-out circuitry configured to read out the at least part of the plurality of photo-sensitive pixels to obtain the measurement values; and an ADC configured to digitize the measurement values, wherein the processing circuitry is configured to determine the histogram based on the digitized measurement values.

In some examples, the ADC supports at least a first resolution and a second resolution for digitizing analog data, the first resolution being lower than the second resolution, and wherein the ADC is configured to digitize the measurement values using the first resolution.

According to some examples, at least one of the plurality of photo-sensitive pixels is configured to selectively store charge carriers generated by the light received from the scene in semiconductor material of the at least one of the plurality of photo-sensitive pixels in different charge storages of the at least one of the plurality of photo-sensitive pixels over time, and wherein the respective measurement value of the at least one of the plurality of photo-sensitive pixels is based on the charge carriers stored in at least one of the different charge storages.

In some examples, the image sensor is a ToF sensor.

According to some examples, at least one of the plurality of photo-sensitive pixels is configured to measure the light received from the scene using a correlation function that increases over distance.

In some examples, the correlation function gives the photo-sensitive pixel's distance-dependent correlation of the light with a reference signal without considering the intensity of the light, the photo-sensitive pixel being driven based on the reference signal.

According to some examples, the processing circuitry is configured to process the histogram by a classification algorithm to determine whether the object is present in the scene.

In some examples, processing circuitry is further configured to train the classification algorithm based on reference image data output by the image sensor.

According to some examples, the image data indicate the measurement values of the at least part of the plurality of photo-sensitive pixels for a single exposure of the plurality of photo-sensitive pixels.

In some examples, the measurement values indicate a respective amount of light received by the at least part of the plurality of photo-sensitive pixels.

According to some examples, the object is a face of a human being.

In some examples, in response to outputting presence data indicating that the object is present in the scene, the interface circuitry is configured to receive trigger data from external circuitry, wherein the image sensor is configured to capture the scene to generate further image data in response to receiving the trigger data, and wherein the interface circuitry is configured to output the further image data.

Other examples relate to an electronic device comprising a sensor device as described herein and an application processor coupled to the sensor device. The application processor is configured to receive the presence data and perform an action based on the presence data According to some examples, the electronic device is one of a mobile phone, a tablet-computer or a laptop-computer.

Further examples relate to a method for performing object detection by a sensor device. The method comprises measuring light received from a scene by a plurality of photo-sensitive pixels of an image sensor of the sensor device. Further, the method comprises determining, by processing circuitry of the sensor device, a histogram based on image data output by the image sensor. The image data are indicative of measurement values of at least part of the plurality of photo-sensitive pixels. The histogram represents a distribution of the measurement values indicated by the image data. In addition, the method comprises determining, by the processing circuitry, whether an object is present in the scene based on the histogram. The method further comprises outputting, by interface circuitry of the sensor device, presence data indicating whether the object is present in the scene.

Still other examples relate to another sensor device. The other sensor device comprises an image sensor comprising a plurality of photo-sensitive pixels configured to measure light received from a scene. The image sensor is configured to output image data indicative of measurement values of at least part of the plurality of photo-sensitive pixels. Additionally, the other sensor device comprises processing circuitry configured to determine a histogram based on the image data. The histogram represents a distribution of the measurement values indicated by the image data. Further, the other sensor device comprises interface circuitry configured to output histogram data indicative of the histogram.

In some examples, the other sensor device further comprises a semiconductor die comprising the image sensor and the processing circuitry.

According to some examples, the image sensor comprises: read-out circuitry configured to read out the at least part of the plurality of photo-sensitive pixels to obtain the measurement values; and an ADC configured to digitize the measurement values, wherein the processing circuitry is configured to determine the histogram based on the digitized measurement values.

In some examples, the ADC supports at least a first resolution and a second resolution for digitizing analog data, the first resolution being lower than the second resolution, and wherein the ADC is configured to digitize the measurement values using the first resolution.

According to some examples, at least one of the plurality of photo-sensitive pixels is configured to selectively store charge carriers generated by the light received from the scene in semiconductor material of the at least one of the plurality of photo-sensitive pixels in different charge storages of the at least one of the plurality of photo-sensitive pixels over time, and wherein the respective measurement value of the at least one of the plurality of photo-sensitive pixels is based on the charge carriers stored in at least one of the different charge storages.

In some examples, the image sensor is a ToF sensor.

According to some examples, at least one of the plurality of photo-sensitive pixels is configured to measure the light received from the scene using a correlation function that increases over distance.

In some examples, the correlation function gives the photo-sensitive pixel's distance-dependent correlation of the light with a reference signal without considering the intensity of the light, the photo-sensitive pixel being driven based on the reference signal.

According to some examples, the image data indicate the measurement values of the at least part of the plurality of photo-sensitive pixels for a single exposure of the plurality of photo-sensitive pixels.

In some examples, the measurement values indicate a respective amount of light received by the at least part of the plurality of photo-sensitive pixels.

According to some examples, the interface circuitry is further configured to receive trigger data from external circuitry, wherein the image sensor is configured to capture the scene to generate further image data in response to receiving the trigger data, and wherein the interface circuitry is configured to output the further image data.

Still further examples relate to another electronic device comprising the other sensor device as described herein and an application processor coupled to the other sensor device. The application processor is configured to receive the histogram data and determine whether an object is present in the scene based on the histogram.

In some examples, the application processor is further configured to perform an action based on whether the object is present in the scene.

According to some examples, the application processor is further configured to send trigger data to the sensor device if the object is present in the scene, wherein the image sensor is configured to capture the scene to generate further image data in response to receiving the trigger data, wherein the interface circuitry is configured to output the further image data, and wherein the application processor is configured to perform an action based on the further image data.

In some examples, the application processor is configured to process the histogram by a classification algorithm to determine whether the object is present in the scene.

According to some examples, the application processor is further configured to train the classification algorithm based on reference image data received from the sensor device.

In some examples, the object is a face of a human being.

According to some examples, the electronic device is one of a mobile phone, a tablet-computer or a laptop-computer.

Examples further relate to another method for performing object detection by an electronic device, wherein the electronic device comprises a sensor device and an application processor. The method comprises measuring light received from a scene by a plurality of photo-sensitive pixels of an image sensor of the sensor device. Further, the method comprises determining, by processing circuitry of the sensor device, a histogram based on image data output by the image sensor. The image data are indicative of measurement values of at least part of the plurality of photo-sensitive pixels. The histogram represents a distribution of the measurement values indicated by the image data. In addition, the method comprises outputting, by interface circuitry of the sensor device, histogram data indicative of the histogram. The method further comprises receiving the histogram data at the application processor and determining, by the application processor, whether an object is present in the scene based on the histogram.

Example of the present disclosure may provide a histogram based object detection mode for an image sensor. Some of the examples may provide an energy efficient on-chip method for mobile phones ToF sensors to detect faces.

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A sensor device, comprising:
   an image sensor comprising a plurality of photo-sensitive pixels configured to measure light received from a scene, wherein the image sensor is configured to output image data indicative of measurement values of at least part of the plurality of photo-sensitive pixels; and
   processing circuitry configured to determine a histogram based on the image data, wherein the histogram represents a distribution of the measurement values, and determine whether an object is present in the scene based on the histogram; and
   interface circuitry configured to output presence data indicating whether the object is present in the scene,
   wherein the image sensor comprises read-out circuitry configured to read out the at least part of the plurality of photo-sensitive pixels to obtain the measurement values, and an analog-to-digital converter (ADC) configured to digitize the measurement values,
   wherein the processing circuitry is configured to determine the histogram based on the digitized measurement values,
   wherein the ADC supports at least a first resolution and a second resolution for digitizing analog data, the first resolution being lower than the second resolution, and wherein the ADC is configured to digitize the measurement values using the first resolution.

2. The sensor device of claim 1, further comprising a semiconductor die comprising the image sensor and the processing circuitry.

3. The sensor device of claim 1, wherein at least one of the plurality of photo-sensitive pixels is configured to selectively store charge carriers generated by the light received from the scene in semiconductor material of the at least one of the plurality of photo-sensitive pixels in different charge storages of the at least one of the plurality of photo-sensitive pixels over time, and wherein the respective measurement value of the at least one of the plurality of photo-sensitive pixels is based on the charge carriers stored in at least one of the different charge storages.

4. The sensor device of claim 1, wherein the image sensor is a time-of-flight (ToF) sensor.

5. The sensor device of claim 4, wherein at least one of the plurality of photo-sensitive pixels is configured to measure the light received from the scene using a correlation function that increases over distance.

6. The sensor device of claim 5, wherein the correlation function gives the photo-sensitive pixel's distance-dependent correlation of the light with a reference signal without considering the intensity of the light, the photo-sensitive pixel being driven based on the reference signal.

7. The sensor device of claim 1, wherein the processing circuitry is configured to process the histogram by a classification algorithm to determine whether the object is present in the scene.

8. The sensor device of claim 7, wherein the processing circuitry is configured to train the classification algorithm based on reference image data output by the image sensor.

9. The sensor device of claim 1, wherein the image data indicate the measurement values of the at least part of the plurality of photo-sensitive pixels for a single exposure of the plurality of photo-sensitive pixels.

10. The sensor device of claim 1, wherein the measurement values indicate a respective amount of light received by the at least part of the plurality of photo-sensitive pixels.

11. The sensor device of claim 1, wherein in response to outputting presence data indicating that the object is present in the scene, the interface circuitry is configured to receive trigger data from external circuitry, wherein the image sensor is configured to capture the scene to generate further image data in response to receiving the trigger data, and wherein the interface circuitry is configured to output the further image data.

12. An electronic device, comprising:
    the sensor device of claim 1; and
    an application processor coupled to the sensor device, wherein the application processor is configured to receive the presence data and perform an action based on the presence data.

13. A method for performing object detection by a sensor device, the method comprising:
    measuring light received from a scene by a plurality of photo-sensitive pixels of an image sensor of the sensor device;
    determining, by processing circuitry of the sensor device, a histogram based on image data output by the image sensor, wherein the image data are indicative of measurement values of at least part of the plurality of photo-sensitive pixels, and wherein the histogram represents a distribution of the measurement values indicated by the image data;
    determining, by the processing circuitry, whether an object is present in the scene based on the histogram;
    outputting, by interface circuitry of the sensor device, presence data indicating whether the object is present in the scene;

reading out, by read-out circuitry of the image sensor, the at least part of the plurality of photo-sensitive pixels to obtain the measurement values;

digitizing, by an analog-to-digital converter (ADC) of the image sensor, the measurement values; and determining, by the processing circuitry, the histogram based on the digitized measurement values, wherein the ADC supports at least a first resolution and a second resolution for digitizing analog data, the first resolution being lower than the second resolution, wherein the ADC is configured to digitize the measurement values using the first resolution.

14. A sensor device, comprising:

an image sensor comprising a plurality of photo-sensitive pixels configured to measure light received from a scene, wherein the image sensor is configured to output image data indicative of measurement values of at least part of the plurality of photosensitive pixels;

processing circuitry configured to determine a histogram based on the image data, wherein the histogram represents a distribution of the measurement values, and process the histogram by a classification algorithm to determine whether an object is present in the scene based on the histogram; and interface circuitry configured to output presence data indicating whether the object is present in the scene, wherein, when processing the histogram by the classification algorithm, the processing circuitry is configured to:

determine either a sum of the absolute differences between bins of the histogram generated from the image data and bins of a reference histogram, or a normalized intersection of the histogram generated from the image data and the reference histogram;

if the sum of the absolute differences is determined, determine that the object is present in the scene if the sum of the absolute differences is below a first threshold value and determine that the object is not present in the scene if the sum of the absolute differences is above the first threshold value; and if the normalized intersection is determined, determine that the object is present in the scene if the sum of the normalized intersection is above a second threshold value and determine that the object is not present in the scene if the sum of the normalized intersection is below the second threshold value.

\* \* \* \* \*